United States Patent [19]
Venable et al.

[11] 3,972,374
[45] Aug. 3, 1976

[54] TRIP MECHANISM FOR GROUND WORKING IMPLEMENT

[75] Inventors: Phillip G. Venable, Orion, Ill.; Harold A. Ralston, Bettendorf, Iowa

[73] Assignee: J. I. Case Company, Racine, Wis.

[22] Filed: Dec. 23, 1974

[21] Appl. No.: 535,227

[52] U.S. Cl. ............................. 172/261; 172/266
[51] Int. Cl.² ........................................ A01B 61/04
[58] Field of Search .......... 172/261, 266, 267, 268, 172/269, 705, 706, 707, 708, 709, 710, 711; 74/520; 180/14.5; 280/193, 455; 171/9; 64/28 R, 29; 56/10.4; 72/451

[56] References Cited
UNITED STATES PATENTS

| | | | |
|---|---|---|---|
| 967,093 | 8/1910 | Waterman | 172/266 |
| 987,604 | 3/1911 | Thomas | 172/268 |
| 1,207,162 | 12/1916 | Grayson | 172/268 |
| 2,679,792 | 6/1954 | Sheppard | 172/268 |
| 3,493,055 | 2/1970 | Peursem | 172/708 |
| 3,765,492 | 10/1973 | Irwin | 172/266 |

*Primary Examiner*—Richard C. Pinkham
*Assistant Examiner*—Richard T. Stouffer
*Attorney, Agent, or Firm*—Dressler, Goldsmith, Clement & Gordon, Ltd.

[57] ABSTRACT

A spring bias safety trip mechanism for holding a ground working tool in a fixed position with respect to a support frame is disclosed herein. The spring bias safety trip mechanism consists of a plurality of links that are interconnected in such a manner that the links act as a rigid bar between the frame and standard and collapse when excessive forces are encountered by the standard. The spring biased linkage system is designed to eliminate the need for large springs that must produce sufficient forces equal to the normal forces encountered during the normal earthworking operation.

12 Claims, 6 Drawing Figures

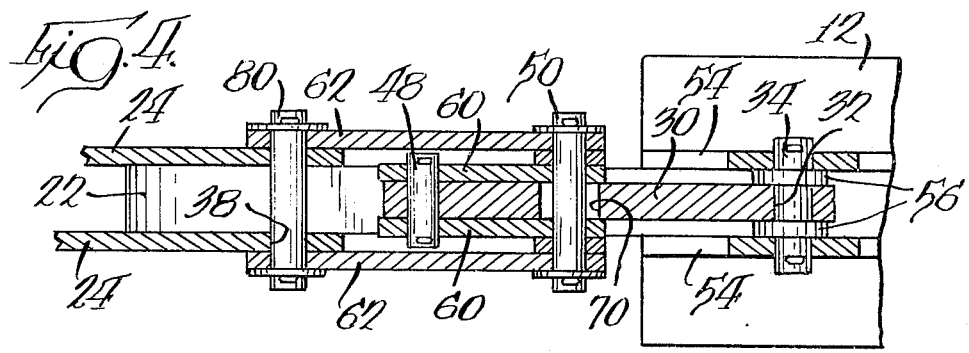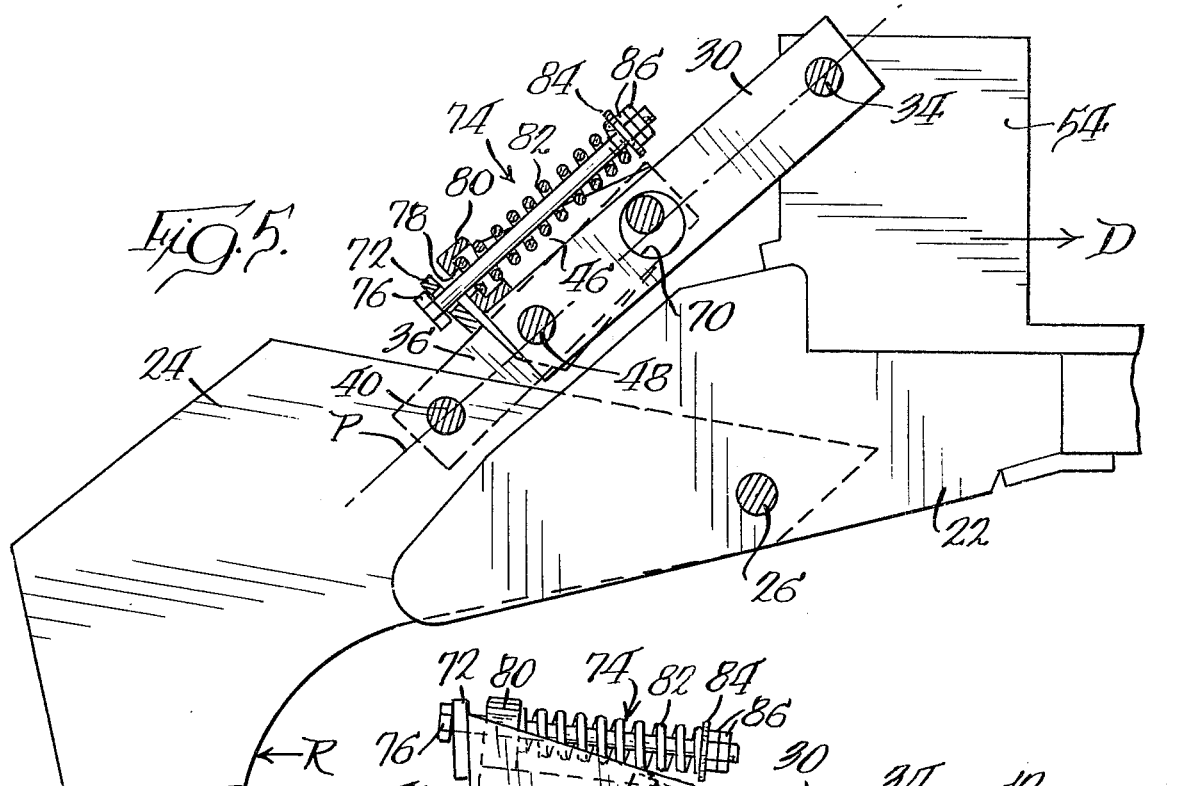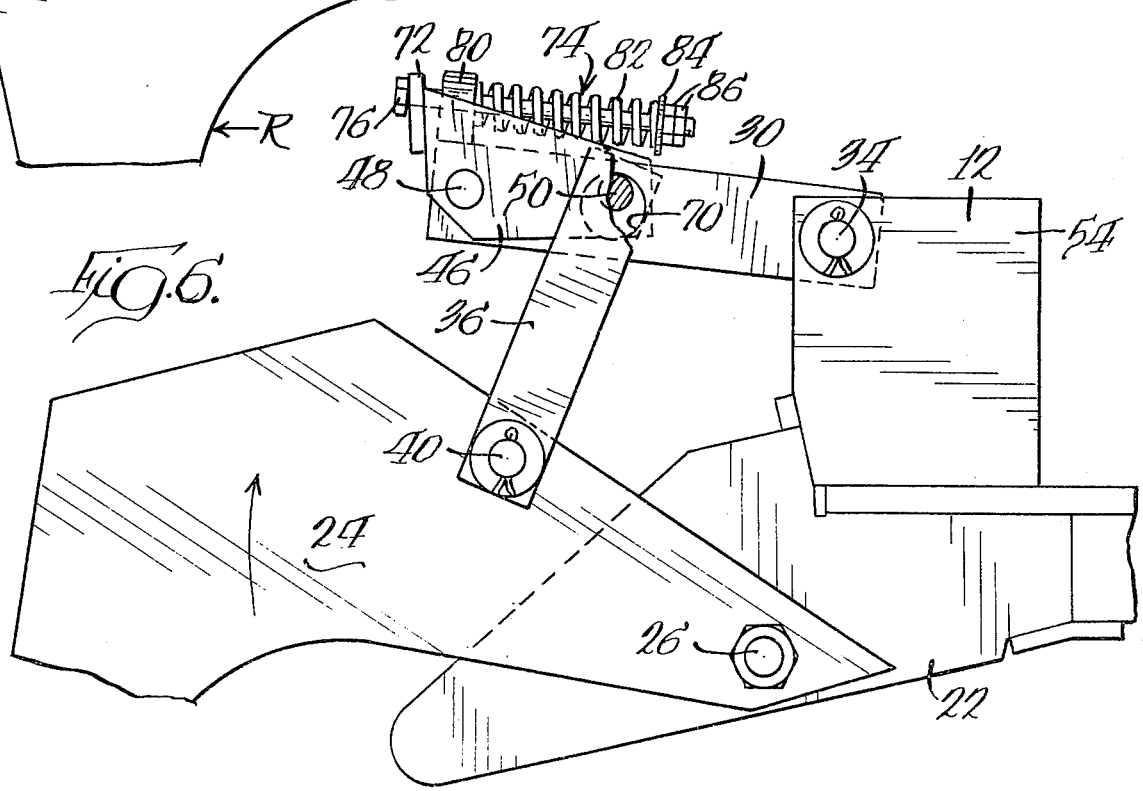

TRIP MECHANISM FOR GROUND WORKING IMPLEMENT

BACKGROUND OF THE INVENTION

Tillage implements having safety trip mechanisms for protecting an earthworking tool against damage when an obstruction is encountered have been well known in the past. These units can normally be placed in two general categories. The first category consists of safety trip mechanisms which will automatically reset the earthworking tool with respect to the frame after the earthworking tool has cleared the obstruction. The other type of safety trip mechanism may be referred to as a manual reset type of unit which is operated when an obstruction is encountered and the operator must then perform some operation to return the ground or earthworking tool to its operative position.

Both of these types of units again may be categorized into two general categories. The first of these categories may be referred to as a pneumatic safety trip mechanism while the second category consists of spring biased safety trip mechanisms.

Examples of spring type trip mechanisms are shown in U.S. Pat. No. 3,662,839, issued May 16, 1972; U.S. Pat. No. 2,860,564, issued Nov. 18, 1958; and U.S. Pat. No. 2,756,659, issued July 31, 1956.

The known type of spring biased trip mechanisms require either an extremely large spring that produces a force greater than the forces acting on the tool or an extremely complicated camming mechanism or both. Both types of spring trip mechanisms, as well as the pneumatic system discussed above, are fairly expensive and, thus, manufacturers of earthworking tools are constantly striving toward producing a better mechanism which is capable of being produced at a reduced cost without sacrificing any benefits gained from the unit during operation.

SUMMARY OF THE INVENTION

The trip mechanism of the present invention may be referred to as a spring biased mechanism in which a plurality of simple links are interconnected in such a manner that they will act as a rigid unit during normal operation and will automatically collapse when a predetermined force is applied thereto. The links are arranged in such a manner that only a small spring force is required for holding the links in a normal operative position. Stated another way, the trip mechanism of the present invention consists of a plurality of links that are interconnected and spring biased to produce an over-center toggle linkage incorporating a small spring which need only be compressed a small amount to allow the earthworking tool associated therewith to move to a tripped position.

BRIEF DESCRIPTION OF THE SEVERAL VIEWS OF THE DRAWINGS

FIG. 4 is an enlarged section of the trip mechanism as viewed along line 4—4 of FIG. 2;

FIG. 5 is a sectional view, as viewed along line 5—5 of FIG. 3 showing the first movement of the linkage; and FIG. 6 is a side elevation view of the trip mechanism in a tripped position, with certain parts broken away for clarity.

DETAILED DESCRIPTION

Figure 1:
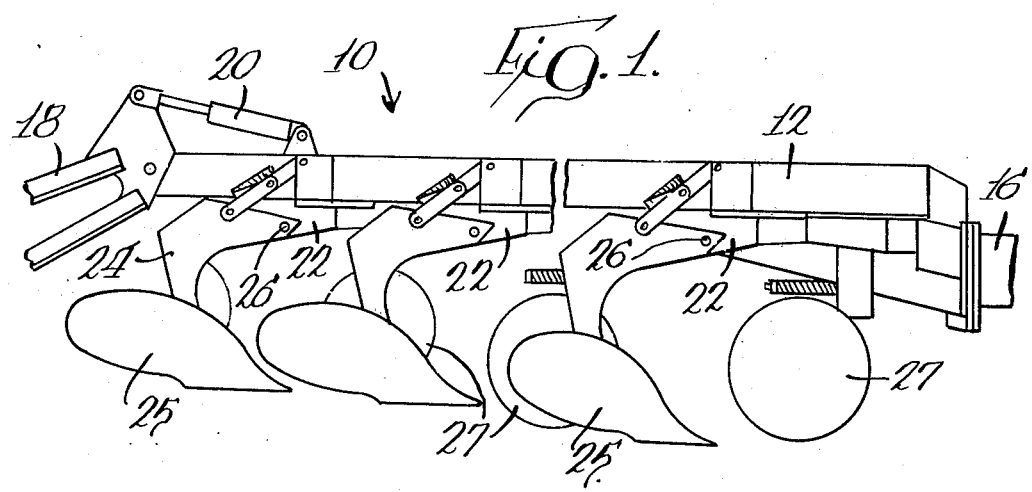
FIG. 1 is a side view of an earthworking tool having the present invention incorporated therein.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

Referring now to FIG. 1 of the drawings, the trip mechanism of the present invention is illustrated in use with a moldboard plow type of earthworking implement 10. It is to be understood that the trip mechanism could also be used with other types of earthworking implements or tools, such as cultivators.

Earthworking tool 10 includes a main frame 12 that has a hitch structure 16 at the forward end thereof for attachment to a vehicle. A rear wheel (not shown) of the earthworking tool or plow is preferably connected by a linkage 18 to the frame 12 and is movable relative thereto by a fluid ram 20.

Main frame 12 also has a plurality of depending beams 22 rigidly secured thereto and forming a part thereof. A standard 24 is pivotally supported on each of the beams 22 by a pivot pin 26. Each standard 24 has a moldboard plow bottom 25 secured thereto and a coulter blade 27 associated therewith.

Figure 2:
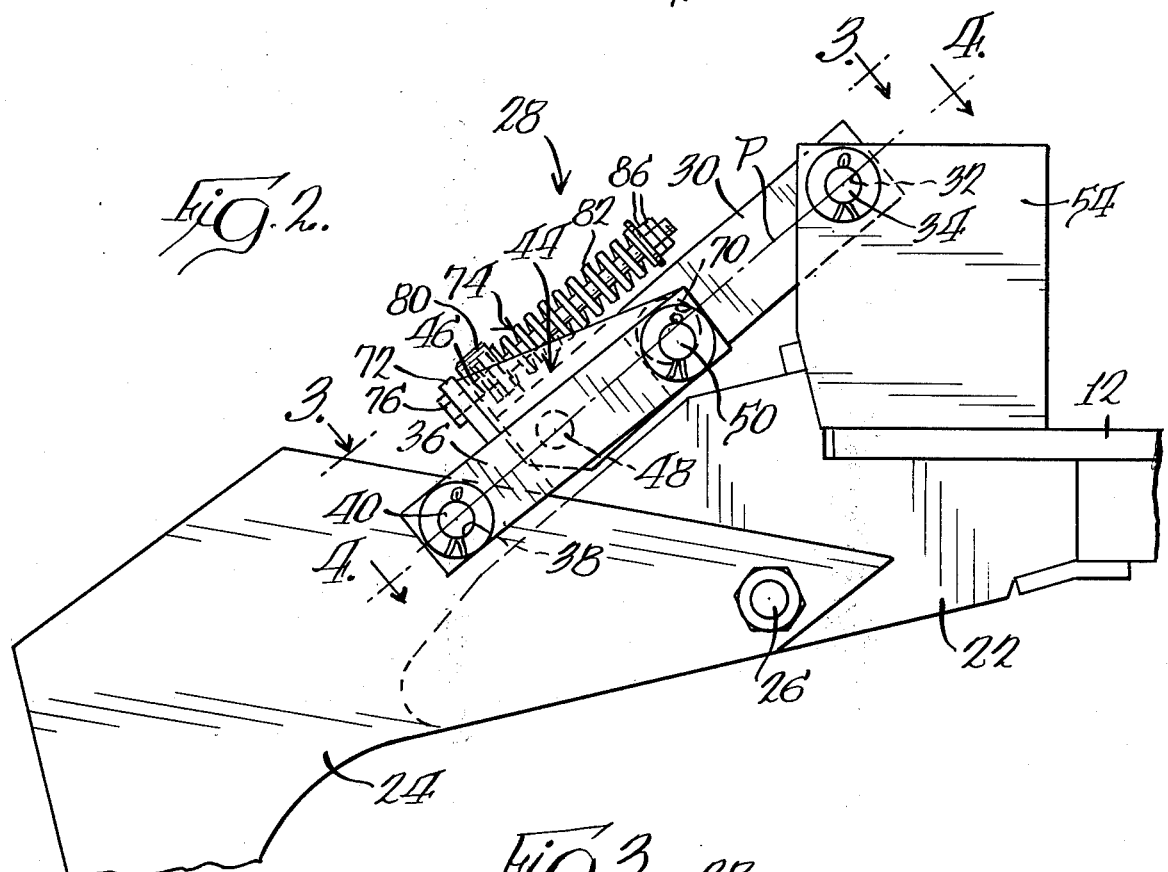
FIG. 2 is a fragmentary enlarged view of a portion of the earthworking tool.
Figure 3:
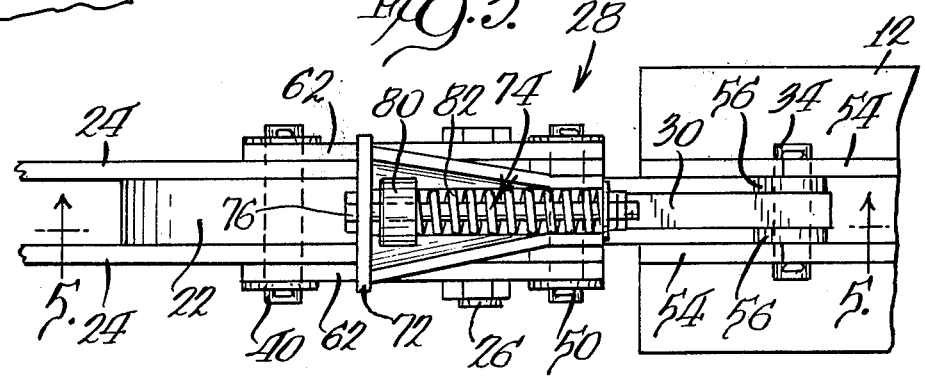
FIG. 3 is a plan view of the trip mechanism as viewed along line 3—3 of FIG. 2.

Standard 24 and moldboard bottom 25 are held in an earthworking position illustrated in FIGS. 1, 2 and 5 by a trip mechanism 28 that is constructed in accordance with the teachings of the present invention and is illustrated in FIGS. 2 and 3. Trip mechanism 28 consists of a first link 30 having an opening 32 at one end for receiving a pin 34 to pivotally support link 30 on frame 12. Trip mechanism or spring biased linkage means 28 also includes a second link 36 having an opening 38 at one end which receives a pin 40 to pivotally support second link 36 on standard 24. Thus, pin 34 defines a first pivot for first rigid link 30 on frame 12 while pin 40 defines a second pivot for second rigid link 36 on standard 24.

Trip mechanism 28 also includes a spring biased linkage mechanism 44 that defines a first position for first and second links 30 and 36, which is illustrated in FIG. 2. Spring biased mechanism 44 includes a third rigid link 46 that has one end connected to first link 30 by a pin 48 which defines a first pivotal connection of third link 46 to the free end of link 30. The opposite end of rigid link 46 is connected by a pin 50 to the free end of second link 36 and defines a second pivotal connection.

Before describing the remainder of the structure, it should be noted that in the specific embodiment illustrated, first link 30 (FIGS. 3 and 4) consists of a single member that is located between a pair of spaced parallel plates 54 which are rigidly secured to frame 12, as by welding, to form a part of frame 12. Preferably, suitable washers 56 are interposed between link 30 and plates 54. Third link 46 consists of a pair of short members 60 that are respectively located on opposite sides of link 30 and extend parallel thereto. Likewise, second link 36 consists of a pair of members 62 which again extend parallel to each other and are located on opposite sides of members 60 defining third link 46. While second and third link 36 and 46 each consist of a pair of members, they will subsequently be referred to as individual links.

According to the present invention, pin 50 defining the pivotal connection between second and third links 36 and 46 extends through an enlarged opening 70 located intermediate opposite ends of first link 30. Opening 70 is substantially larger than the size of pin 50, for a purpose that will be described later.

Also, spring biased linkage mechanism 44 includes a stop member 72 that is adapted to be biased into engagement with link 36 by spring means 74. As most clearly shown in FIG. 5, spring means 74 consists of a bolt 76 that extends through an opening in stop member 72 and through an enlarged opening 78 in a cup shaped member 80 that is rigidly secured to first link 30, as by welding. A coil spring 82 is positioned over bolt 76 and a washer 84 and nuts 86 are received on the free end of bolt 76. Thus, coil spring 82 engages cup 80 at one end and washer 84 at the opposite end and the compression of coil spring 82 can readily be varied by the use of nuts 86.

Spring means 74 will normally urge the three links to the position illustrated in FIG. 2 wherein stop means 72 engages second link 36 and the three links all extend generally parallel to each other. In this position, the center of pin 50 is located on one side of a plane P extending through the centers of pins 34 and 40 while pin 48 is located on the opposite side. The position of the three links 30, 36 and 46 illustrated in FIG. 2 is the first position for trip mechanism 28 which maintains standard 24 in an earthworking position with respect to frame 12. In this first position for links 30, 36 and 46, it will be noted that all three links extend generally parallel to each other and third link 46 is located between the overlapping portions of links 30 and 36.

In this position, the center of pivot pin 48, defining the first pivotal connection between links 30 and 46, is in very close proximity to plane P, and in certain instances, may in fact be located directly on plane P, but can never be located on the same side of plane P as pivot pin 50. In the position of spring biased linkage means 28 shown in FIG. 2, only a small force is necessary to maintain the linkage in the position illustrated while the linkage system is capable of resisting large forces developed on standard 24. The ability of utilizing a very small force as the spring force for the linkage system results for the fact that pivot pin 48 is located in close proximity to plane P.

When excessive forces are developed on standard 24 resulting from an obstruction for bottom 25, the spring force of coil spring 82 will be overcome and the initial movement of the linkage system will result in a small amount of pivotal movement of link 36 about pivot pin 40. During this initial movement, pivotal connection 50 will be moved from the position illustrated in FIG. 2 to that illustrated in FIG. 5 where it is clearly shown that both pivot pins 48 and 50 are now located on the same side of plane P. When pivotal connection 50 reaches the opposite side of enlarged opening 70, it will subsequently define the primary pivot between first and second links 30 and 36 during subsequent pivotal movement of the links about their respective pivots ultimately to the position illustrated in FIG. 6 wherein the standard 24 has been pivoted upwardly a sufficient amount to allow moldboard bottom 25 to pass over the obstruction.

After passing over the obstruction, it is only necessary for the operator to raise the main frame 12 to the position where all of the bottoms 25 are located above the ground during which time the weight of standard 24 and bottom 25 will cause the linkage to return to the first position illustrated in FIG. 2.

As can be appreciated from the above description, the spring biased linkage means or trip mechanism is extremely simple in construction and allows for the use of a small coil spring 82 which is never compressed any substantial amount. Since there is only limited relative movement between cup 80 and stop member 72, the amount of movement being illustrated by the respective positions of these elements in FIGS. 2 and 5, the service life of the coil spring is extended substantially.

By way of example and not of limitation, the coil spring incorporated into the trip mechanism of the present invention need only develop forces in the neighborhood of 400 pounds in order to provide sufficient resistance for holding a standard size moldboard bottom in an earthworking position and resisting forces on the bottom of at least 4,000 pounds.

What is claimed is:

1. In an earthworking implement having a frame, a standard, pivotal means pivotally attaching the standard to the frame, and a trip mechanism between said frame and standard normally maintaining said standard in an earthworking position and accommodating pivotal movement about said pivotal means when excessive forces are developed on said standard, characterized by said trip mechanism including a first rigid link, a first pivot pin directly interconnecting said first link and said frame by a first pivot, a second rigid link, a second pivot pin directly interconnecting said second link and said standard by a second pivot, and a spring biased linkage mechanism located between said first and second links, and a first pivotal connection directly connecting said mechanism to a free end of said first link, a second pivotal connection directly connecting said mechanism to a free end of said second link, said spring biased linkage mechanism having stop means engaging one of said links and defining a first position for said first and second links where one of said pivotal connections is located on one side of a plane extending through said first and second pivots, said spring biased linkage mechanism accommodating movement of said one of said pivotal connections to an opposite side of said plane to allow said first and second links to respectively pivot about said first and second pivots when excessive forces are developed on said standard.

2. An earthworking implement as defined in claim 1, in which said first and second links have overlapping portions adjacent said free ends in said first position and said spring biased linkage mechanism includes a third link having opposite ends respectively connected to the free ends of said first and second links and said third link is located between the overlapping portions of said first and second links.

3. An earthworking implement as defined in claim 2, in which said one of said pivotal connections is said second pivotal connection and in which said first link includes means for limiting the movement of said second pivotal connection relative to said first link.

4. An earthworking implement as defined in claim 3, in which said one of said pivotal connections is a third pivot pin between said second link and said spring biased linkage mechanism and in which said first link has an opening intermediate opposite ends with said third pivot pin received in said opening and defining said means for limiting movement, said opening being larger than the size of said third pivot pin to accommodate pivotal movement of said pivot pin from said one side of said plane to said opposite side and then defining a primary pivot between said first and second links during subsequent pivotal movement of said first and second links about said first and second pivots.

5. An earthworking implement as defined in claim 1, in which said spring biased linkage mechanism includes a third link having one end connected to said first link by said first pivotal connection and an opposite end connected to said second link by said second pivotal connection.

6. An earthworking implement as defined in claim 5, in which said stop means includes an element on said third link adapted to engage one of said first and second links, and in which said spring biased linkage mechanism includes a spring interposed between said third link and the other of said first and second links, said spring being positioned to bias said element toward said one of said first and second links.

7. An earthworking implement as defined in claim 6, in which said first and second links having overlapping portions adjacent said free ends in said first position and said third link is located between the overlapping portions of said first and second links in said first position.

8. A trip mechanism for holding a standard in an earthworking position with respect to a frame and accommodating pivotal movement of the standard on the frame when excessive forces are developed on the standard comprising, a linkage including a first link having an opening at one end adapted to define a first pivot for said linkage, a second link having an opening at one end adapted to define a second pivot for said linkage and a third link, a first pivot pin pivotally connecting one end of said third link to an opposite end of said first link, a second pivot pin pivotally connecting an opposite end of said third link to an opposite end of said second link, said first link having an enlarged opening intermediate the one end and the opposite end thereof receiving therein said second pivot pin, stop means on said third link, and biasing means between said third link and said first link for biasing said stop means into engagement with said second link, said biasing means normally maintaining said links in a generally parallel position with respect to each other in a rigid force resisting position.

9. A trip mechanism as defined in claim 8, in which said enlarged opening is of sufficient size to locate said second pivot pin on one side of a plane extending through said first and second pivots when said stop member is in engagement with said second link, said second pivot pin moving to the opposite side of said plane during initial pivotal movement of said links relative to each other and subsequently defines a primary pivot between said first and second links during subsequent pivotal movement.

10. In an earthworking implement having a frame, a standard, pivotal means pivotally attaching the standard to the frame, and a trip mechanism between said frame and standard normally maintaining said standard in an earthworking position and accommodating pivotal movement about said pivotal means when excessive forces are developed on said standard, characterized by said trip mechanism including a first rigid link pivoted on said frame by a first pivot, a second rigid link pivoted on said standard by a second pivot, and a spring biased linkage mechanism having a first pivotal connection to a free end of said first link and a second pivotal connection to a free end of said second link, said spring biased linkage mechanism having stop means defining a first position for said first and second links where one of said pivotal connections is located on one side of a plane extending through said first and second pivots, said first and second links having overlapping portions adjacent said free ends in said first position and said spring biased linkage mechanism including a third link having opposite ends respectively connected to the free ends of said first and second links, said third link being located between the overlapping portions of said first and second links, one of said pivotal connections including a pivot pin between said second link and said third link with said first link having an opening intermediate opposite ends and receiving therein said pivot pin, said opening being larger than the size of said pivot pin to accommodate pivotal movement of said pivot pin from said one side of said plane to an opposite side and then defining a primary pivot between said first and second links during subsequent pivotal movement of said first and second links about said first and second pivots.

11. In an earthworking implement having a frame, a standard, pivotal means pivotally attaching the standard to the frame, and a trip mechanism between said frame and standard normally maintaining said standard in an earthworking position and accommodating pivotal movement about said pivotal means when excessive forces are developed on said standard, characterized by said trip mechanism including a first rigid link pivoted on said frame by a first pivot, a second rigid link pivoted on said standard by a second pivot, said first and second links having overlapping portions adjacent free ends thereof, and a spring biased linkage mechanism including a third link located between said overlapping portions and having one end connected to said first link by a first pivot pin and an opposite end connected to said second link by a second pivot pin, an element on said third link adapted to engage one of said first and second links, a spring interposed between said third link and the other of said first and second links, said spring being positioned to bias said element toward said one of said first and second links where said pivot pin is located on one side of a plane extending through said first and second pivots, said first link having an opening intermediate opposite ends receiving said second pivot pin, said opening being larger than said second pivot pin and accommodating limited movement of said pivot pin and said first link during movement of said pivot pin to an opposite side of said plane with said pivot pin subsequently defining the primary pivot between said first and second links during subsequent pivotal movement of said links about their respective pivots.

12. An earthworking implement as defined in claim 11, in which said third link and spring move as a unit with said first link during the subsequent pivotal movement of said first and second links.

* * * * *